Oct. 16, 1962   J. G. VAN DE VUSSE ETAL   3,059,005
PROCESS FOR THE PRODUCTION OF CARBOXYLIC ACIDS
Filed Dec. 10, 1959
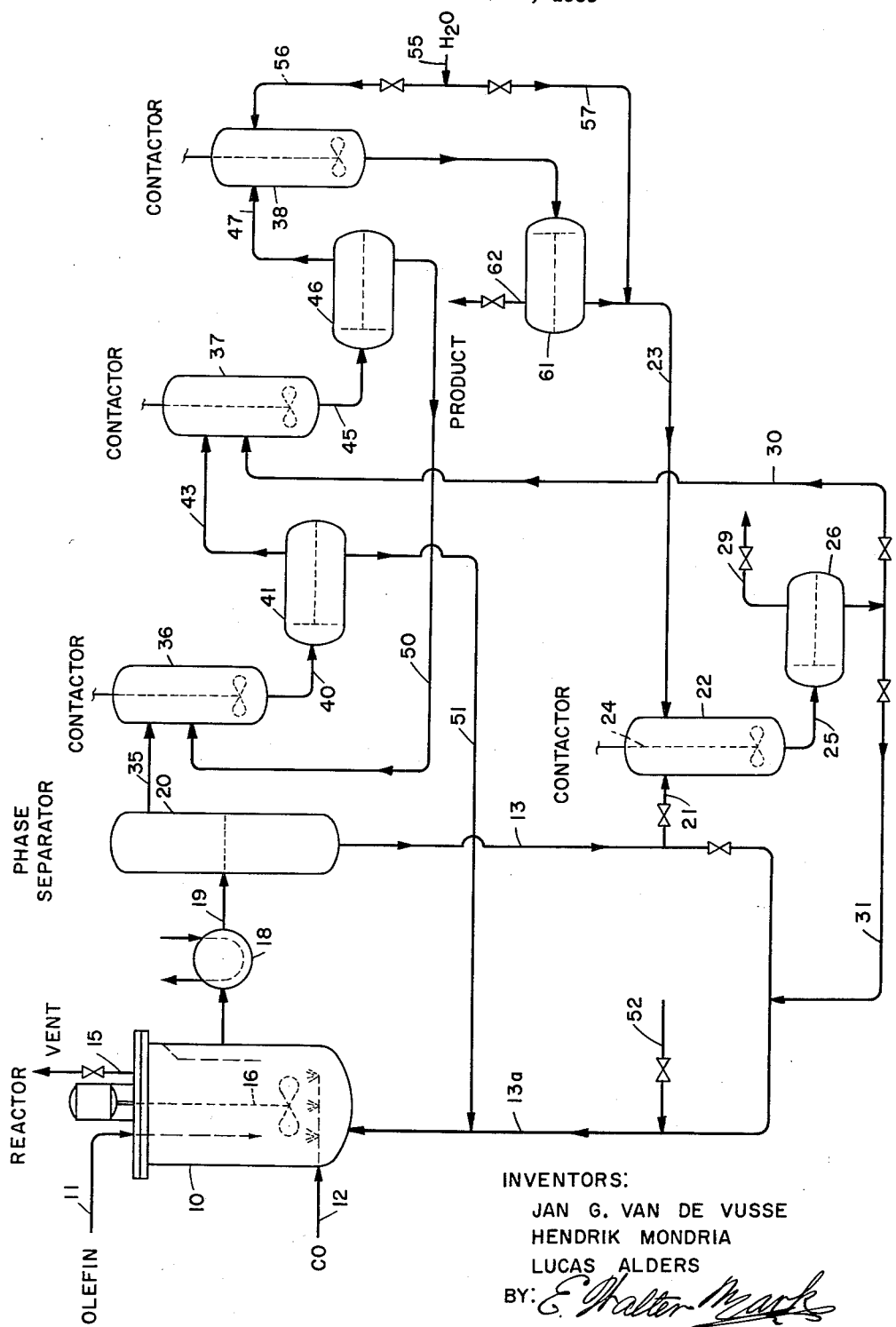
INVENTORS:
JAN G. VAN DE VUSSE
HENDRIK MONDRIA
LUCAS ALDERS
BY: *E. Walter Mack*
THEIR AGENT United States Patent Office 3,059,005
Patented Oct. 16, 1962

3,059,005
PROCESS FOR THE PRODUCTION OF
CARBOXYLIC ACIDS
Jan G. Van de Vusse, Hendrik Mondria, and Lucas
Alders, Amsterdam, Netherlands, assignors to Shell Oil
Company, a corporation of Delaware
Filed Dec. 10, 1959, Ser. No. 858,796
Claims priority, application Netherlands Dec. 31, 1958
13 Claims. (Cl. 260—413)

This invention relates to the production of carboxylic acids. The invention relates more particularly to improvements in the production of carboxylic acids from starting materials comprising carbon monoxide, mono-olefinically unsaturated compounds and water.

It is known that organic acids are obtained by contacting mixtures containing carbon monoxide, water and an organic compound, such as for example an olefin, with certain specific catalysts under controlled conditions of temperature and pressure. Many of the processes disclosed heretofore rely upon the use of exceedingly high pressures, often in combination with relatively high temperatures. The practicality of such processes is often further handicapped by inability to produce a particularly desired acid as the predominant reaction product. Processes disclosed heretofore carried out in liquid phase are generally executed under conditions rendering difficult, if not impossible, the maintenance of constant conditions throughout the reaction zone, thereby producing by-products in substantial amounts.

More recently it has been found that with the aid of certain highly acidic catalysts the use of severe reaction conditions, including high pressures, can be avoided if the operation is conducted in two successive stages with the exclusion of water in the first stage and the addition of all of the water required to form the acid in the second stage. In a modification of this type of operation the use of certain specific catalysts enables the addition of a fraction, but not all, of the water of reaction in the first stage of the two stage process.

The need to rely upon two separate reaction stages to complete the desired reaction, each requiring the maintenance of different controlled reaction conditions therein, adds materially to the complexity and cost of the process. A further disadvantage of the two stage type of operation resides in the relatively high catalyst cost generally incurred therein due to the fact that the second stage generally converts the catalyst to a condition in which it is unsuitable for recycling to the system without costly operative procedure.

In co-pending application Serial No. 858,609, filed December 10, 1959, there is disclosed and claimed a process which now makes possible the direct production of the desired carboxylic acids in a continuous single stage operation at moderate conditions of temperature and pressure. In the process of said co-pending application carboxylic acids are produced by introducing charge materials comprising carbon monoxide, an olefin, water in stoichiometrical excess over said olefin, and a liquid highly acidic catalyst into the reaction zone, while maintaining a homogeneous liquid phase of substantially constant composition at relatively constant temperature in the range of from about −10 to about 150° C. in said reaction zone throughout the course of the process, and continuously withdrawing liquid phase from the reaction zone at such a controlled rate that the condition of constant composition within the reaction zone is maintained. A distinguishing feature of the process resides in the ability to maintain optimum reaction conditions uniformly throughout the entire reaction zone. In the production of carboxylic acids in liquid phase with the aid of the complex-type catalysts as disclosed and claimed in the said co-pending application the reactor effluence is generally separated into two phases, viz., an organic phase containing carboxylic acid products and unconverted hydrocarbons and a substantially inorganic phase containing the catalyst.

In addition to desired carboxylic acid certain organic by-products comprising, for example, organic materials of polymeric character are often unavoidably formed in varying amounts. When separating the reaction zone effluence into the separate phases at least a part of these organic by-products will generally pass into the inorganic catalyst-containing phase and thus be recycled to the reaction zone. Such organic by-products are referred to herein-after and in the attached claims as "organic impurities." The build-up of these by-products in the system adversely affects the activity of the catalyst. Another factor presenting difficulties as a consequence of the nature of the type of catalysts used is a tendency for catalyst components to be entrained in the product-containing organic phase. The removal of organic by-products from the catalyst phase, and the separation of entrained catalyst components from the carboxylic acid-containing product phase presents problems which at times exert a decided effect upon the efficiency of the process.

It is an object of the present invention to provide an improved process enabling the more efficient production of carboxylic acids in the liquid phase from olefinic compounds, carbon monoxide and water in the presence of the complex type catalysts wherein these difficulties are obviated to at least a substantial degree.

Another object of the invention is the provision of an improved process enabling the more efficient production of carboxylic acids from olefins, carbon monoxide and water with the aid of the liquid complex type catalysts in a system integrating the carboxylic acid producing reaction and catalyst recovery and purification in a single unitary operation.

Still another object of the invention is the provision of an improved process enabling the more efficient production of carboxylic acids from olefinic compounds, carbon monoxide and water with the aid of complex type catalysts wherein the catalyst is separated and purified within the system in the absence of agents from an outside source. Other objects and advantages of the invention will become apparent from the following detailed description thereof made with reference to the attached drawing wherein the single figure represents more or less diagrammatically one form of apparatus suitable for carrying out the process of the invention.

In accordance with the invention carboxylic acids are produced by the reaction of an olefinic compound with carbon monoxide and water in the presence of a liquid, complex, catalyst comprising a boron trifluoride-polybasic inorganic acid complex at relatively moderate reaction conditions, in a reaction zone integrated with a catalyst recovery and purification system wherein the effluence from the reaction zone is separated into a first organic phase comprising carboxylic acid product and unconverted hydrocarbons and a substantially inorganic phase comprising catalyst containing organic impurities in a reaction mixture stratifying zone; the inorganic phase so obtained is diluted with water in a primary catalyst purifying zone thereby forming a second organic phase comprising organic impurities and an aqueous catalyst phase in said primary catalyst purifying zone, and said aqueous catalyst phase is passed to the reaction zone. In a preferred embodiment of the invention the aqueous catalyst phase formed in said first catalyst purifying zone is brought into liquid contact in a secondary catalyst purifying zone with said first organic phase separated in said reaction mixture stratifying zone before being passed to the reaction zone. In a still further embodiment of the invention substantially all water employed as reactant in the reaction zone is introduced into the primary catalyst purifying zone of the system and passes therefrom to the reaction zone in admixture with the catalyst.

Olefinic compounds employed as charge to the process of the invention comprise the mono-olefinically unsaturated organic compounds having at least three carbon atoms to the molecule. Examples of such suitable olefinic compounds are the monolefinic hydrocarbons such as propylene, butylene-1, butylene-2, isobutylene, branched or unbranched pentenes, hexenes, heptenes, octenes, nonenes, decenes and higher alkenes; polymers and copolymers of alkenes, such as di-isobutylene, propylene tetramer; cyclic alkenes, such as cyclopentene and cyclohexene, as well as unsaturated fatty acids or hydroxy fatty acids which may form unsaturated fatty acids under the reaction conditions, etc. Commercially available mixtures comprising these alkenes may also be used, for example, olefin-containing hydrocarbon fractions such as obtained by thermal vapor phase cracking of paraffin wax in the presence of steam. These fractions not only contain alkenes but generally also paraffins, naphthenes and aromatics, which usually do not take part in the synthesis. Their presence promotes the separation into layers of the reactor effluence, the same also being true of the alkenes unconverted during the reaction.

The process of the invention is not limited with respect to the source of the carbon monoxide-containing gas employed. Thus the carbon monoxide-containing gas may comprise any mixture containing carbon monoxide in admixture with one more normally gaseous materials such as, for example, hydrogen, nitrogen, carbon dioxide, lower paraffins, and the like. Suitable carbon monoxide-containing gas charge materials comprise, for example, commercially available water gas, coke oven gas, generator gas, carbon monoxide-containing tail gases from industrial operations, etc.

The process of the invention is executed in the presence of a liquid, highly acidic, inorganic compound as catalyst. Suitable catalysts comprise the liquid complex mixtures obtained by combining boron trifluoride, water and a polybasic inorganic acid such as, for example, phosphoric acid, sulfuric acid and the like. Preferred catalysts comprise the complex mixtures of boron trifluoride-phosphoric acid-water containing a mol ratio of phosphoric acid to boron trifluoride in the range of from about 0.8:1.2 to about 1.2:0.8 having a water content of from about 7 to about 12% by weight (based upon total boron trifluoride and phosphoric acid). A particularly preferred catalyst comprises the complex mixtures containing about equimolar amounts of boron trifluoride and phosphoric acid and approximately 10% by weight of water (based upon the total weight of boron trifluoride plus phosphoric acid).

Referring to the drawing; an olefinicially unsaturated compound having at least three carbon atoms to the molecule, for example, a mono-olefin or a mixture of mono-olefins, such as a $C_3$–$C_{10}$ olefinic hydrocarbon fraction is introduced into a suitable reaction zone, for example, a reactor 10, by means of valved line 11. The olefinic charge so introduced into the reactor 10 may emanate in part or entirety from an outside source, or may comprise olefinic compounds recycled from conventional recovery means, not shown in the drawing, associated with the integrated reaction-catalyst recovery system.

A liquid, highly acidic catalyst, for example, a complex mixture consisting essentially of boron trifluoride, phosphoric acid and water, emanating at least in part from within the system as described herein below, is passed into reactor 10 by means of line 13a. Water reactant is introduced into reactor 10 together with the catalyst through line 13a as described more fully below. Reactor 10 is provided with suitable agitating means such as, for example, stirrer 16, as well as the suitable conventional means not shown in the drawing to maintain the desired conditions of temperature therein.

Carbon monoxide, or a carbon monoxide-containing gas, for example, water gas, is introduced into reactor 10 through line 12. A vent line 15 is provided for bleeding gaseous phase from reactor 10. Such vented gas may be eliminated from the system or sent to suitable recovery means not shown in the drawing to recover valuable components therefrom.

Contents within the reactor 10 are subjected to reaction conditions effecting the interaction of carbon monoxide, olefinic charge and water with the formation of reaction products comprising carboxylic acids. Suitable conditions comprise those disclosed in said co-pending application Serial No. 858,609. Thus, the contents of the reactor may be maintained at a temperature in the range of from about −10 to about 150° C. and at a pressure in excess of about 20 atmospheres, for example, from about 20 to about 175 atmospheres. In a preferred method of operation liquid contents of reactor 10 are maintained in substantially homogeneous liquid phase of relatively constant composition at a substantially constant temperature throughout the course of the operation. When the reaction is executed continuously in substantially homogeneous liquid phase the residence time may vary from about 0.5 to about 4 hours. Reactor 10 under these conditions may comprise one or more liquid phases. The term "homogeneous" as used herein and in the attached claims is intended to include the case in which two or more liquid phases, when present, are substantially uniformly distributed in each other.

Reaction conditions preferably employed may vary within the scope of the invention in accordance with the specific olefinic charge and catalyst employed. With the use of complex mixtures comprising phosphoric acid, boron trifluoride and water, in which the phosphoric acid to boron trifluoride mol ratio is in the range of from about 0.8:1.2 to about 1.2:0.8, a water content of from about 5 to about 11% by weight (based on the sum of phosphoric acid, boron trifluoride and water present in the reactor 10) and a temperature in the range of from about 40 to about 100° C. is generally preferred. The water content may be varied with increase or decrease in the phosphoric acid to boron trifluoride ratio. These mixtures generally have the highest activity at an approximately equal molar ratio of phosphoric acid to boron trifluoride. When this ratio is departed from it is preferred to use a higher temperature, for example, from about 80° C. to about 100° C. With the use of sulphuric acid containing 4 to 10% by weight of water the reaction is preferably executed at a temperature of from about 20 to about 35° C. and at the higher pressures within the specified range.

The molar ratio of water to the amount of olefins introduced into reactor 10 is generally maintained in the range of from about 1:1 to about 30:1, preferably from abuot 2:1 to about 6:1. The water supplied usually is in the range of from about 2 to about 15% by weight of the total quantity of liquid inorganic material (mainly catalyst components) supplied during an equivalent period of time. Though the water to the reactor 10 is generally entirely supplied in admixture with the catalyst through line 13a minor amounts of water may be introduced separately into the reactor 10 by means not shown in the drawing should this be desired.

Under the above-defined conditions olefins having at least three carbon atoms to the molecule result in a reaction mixture in which the predominating organic acid is a secondary or tertiary carboxylic acid. The organic acids obtained will generally correspond to the compounds obtained by removing an olefinic linkage in the olefinic charge and attaching a carboxy group (—COOH) directly to one, and a hydrogen atom to the other, of the two olefinically-unsaturated carbon atoms linked by the olefinic bond in the charge material. Propylene results in isobutyric acid; butene-1 and butene-2 in 2-methyl butyric acid; isobutylene in trimethylacetic acid; octene-1 and octene-2 in 2-methyl octenoic acid; cyclohexene in acids comprising methyl cyclopentane carboxylic acid and cyclohexane carboxylic acid; etc. Mixtures of olefins will result in the obtaining of mixtures of fatty acids having on the average one more carbon atom to the molecule than the olefinic components of the charge.

Liquid phase comprising carboxylic acid product, unconverted hydrocarbons, catalyst, and organic impurities comprising by-products including materials of polymeric character, are passed from reactor 10, through transfer line 19, provided with suitable cooling means, for example, heat exchanger 18, into a suitable reaction mixture stratifying zone, for example chamber 20. Within chamber 20 the total liquid reactor effluence separates into two liquid phases, viz., a supernatant organic phase comprising carboxylic acid product and unconverted hydrocarbons and a substantially inorganic phase comprising catalyst and entrained organic impurities.

The substantially inorganic phase is passed from chamber 20, through lines 13 and 21, into a suitable primary catalyst purifying zone comprising, for example, chamber 22 provided with stirrer 24, and a phase separator 26. Water is introduced into chamber 22 by means of lines 23. The water so introduced into chamber 22 preferably does not exceed the amount of water consumed in the formation of carboxylic acid in reactor 10 and that lost from other causes. Within chamber 22 the admixed water and substantially inorganic phase are agitated and passed therefrom into phase separator 26. In separator 26 a supernatant organic phase consisting essentially of organic impurities comprising materials of a polymeric nature separate from a liquid aqueous catalyst phase consisting essentially of catalyst and water. The organic phase comprising organic impurities so separated in phase separator 26 is eliminated from the system through valved line 29. The organic phase so withdrawn through valved line 29 generally contains no substantial amount of carboxylic acid product. However, should carboxylic acid be comprised within this organic phase they may be recovered therefrom by conventional means, optionally in conjunction with the recovery of the carboxylic acid product from the crude product of the process.

All, or only a part, of the substantially inorganic phase withdrawn from chamber 20 is introduced into chamber 22. The extent to which organic materials are separated within phase separator 26 is dependent upon the mixing ratio of the two liquid phases and, therefore, upon the amount of water introduced into chamber 22. Optimum separation is obtained with a definite amount of water depending upon composition of the substantially inorganic phase. The amount of water preferably used in a specific operation is readily determined by routine determination. In accordance with a preferred embodiment of the invention the amount of water introduced into chamber 22 through line 23 is controlled to equal substantially that required to make up the water consumed in the reaction zone. The amount of substantially inorganic phase introduced into chamber 22 from line 13 is correlated with the amount of water so introduced to provide the optimum conditions of separation within chamber 22. The portion of the catalyst phase not introduced into chamber 22 from line 13 is recycled directly to reactor 10. In general the proportion of the substantially inorganic catalyst phase introduced into chamber 22 through line 21 will be the range of from about 5 to about 30%, and more generally in the range of from about 10 to about 20%, of the flow through valved line 13. Aqueous catalyst phase containing no substantial amount of organic impurities is passed from separator 26 through line 31 into line 13a leading into reactor 10. In this wise the primary catalyst purifying zone provides for the continuous removal of organic impurities from within the system while simultaneously providing for the maintenance of the catalyst at substantially optimum activity throughout a substantially longer period of operation.

A valved line 52 is provided for the introduction of make-up catalyst into the system from an outside source.

In a preferred embodiment of the invention the aqueous catalyst phase separated within separator 26 is subjected to a further purification treatment within a second catalyst purification zone of the process. Within the second catalyst purification zone of the process the aqueous catalyst phase is brought into liquid contact with at least a part of the organic phase separated in the phase separator 20 receiving the reaction zone effluence. The second catalyst purification zone may comprise suitable means enabling the scrubbing, washing, extraction, or the like, in liquid phase, of the aqueous catalyst phase with the organic product phase. Thus the second catalyst purifying zone may comprise one or more contacting chambers such as, for example, contactors 36 and 37, provided with stirring means, and associated with phase separators 41 and 46, respectively. Although two such contactors are here shown in series flow, it is to be understood that the second catalyst purifying zone may comprise only one or a greater number of such contactors. Within the second catalyst purifying zone the aqueous catalyst separated in separator 26 is freed of residual organic components which may be present therein. The characteristics of the complex type catalysts are often such as to render difficult the removal of all impurities therefrom by water washing, particularly with a specified amount of water. In the second catalyst purifying zone of the process any residual impurities are removed within the system without the need of agents from an outside source. A further advantage of the presence of the secondary catalyst purifying zone resides in the greater degree of freedom from the standpoint of operational procedure provided in the process. Any departure from optimum conditions within chamber 22 are offset completely by the effect of the secondary catalyst purifying zone. Aqueous catalyst phase is passed from separator 26 through valved line 30 into contactor 37. Within contactor 37 the aqueous catalyst phase is contacted with organic product phase emanating from line 43. Contents of chamber 37 are passed into phase separator 46 wherein organic phase and aqueous catalyst phase are separated. The aqueous catalyst phase is passed through line 50 into contactor 36 wherein it is again contacted with organic phase emanating thereto from phase separator 20 through line 35. Contents of contactor 36 are passed into phase separator 41 wherein the organic phase is separated from the aqueous catalyst phase. The organic phase is passed therefrom through line 43 into contactor 37. The purified aqueous catalyst phase is now passed from separator 41 through line 51 into line 13 leading into reactor 10. All, or only a part of the aqueous catalyst phase taken from separator 26 through valved line 30 may be passed to contactor 37. When passing only part of such stream to the contactor 37 the rest is passed to the reactor 10.

In removing the last traces of impurities from the aqueous catalyst phase in contactors 36 and 37 the product organic phase will entrain a certain amount of catalyst components. It is advantageous, from a standpoint of product purity and catalyst economy to have these catalyst components returned to the system. In accordance with the invention the organic phase is therefore subjected to liquid contact with water before leaving the system in a product purifying zone. To this effect the organic product phase, comprising carboxylic acids, unconverted hydrocarbons and catalyst components is passed from separator 46 through line 47 into contactor 38 associated with phase separator 61. Within contactor 38 the organic product phase is contacted with water introduced therein through valved line 56 and emanating from an outside source through line 55. Contents of contactor 38 are passed therefrom into phase separator 61 through line 60. Within separator 61 organic product phase comprising carboxylic acids and unconverted hydrocarbons are separated from an aqueous phase consisting essentially of water containing catalyst components extracted from said organic product phase.

The organic phase is taken from phase separator 61 through valved line 62 as a final product.

The aqueous phase is passed from separator 61 through line 23 into chamber 22 to be used therein as the water to extract the substantially inorganic phase therein. A valved line 57 is provided for the passage of a water, emanating from an outside source, directly into line 23.

The invention is further illustrated by the following example:

EXAMPLE

Carboxylic acids were produced by reacting an olefinic hydrocarbon fraction containing hydrocarbons having from eight to ten carbon atoms to the molecule with carbon monoxide and water in the presence of a complex of boron trifluoride with phosphoric acid in accordance with the invention in apparatus substantially that shown in the drawing but with the exception that the washing of the product with water in contactor 38 was effected in two stages. For the purpose of clarity, description of the carboxylic acid production in this example will be made with reference to the attached drawing; the numbers in parenthesis identifying the pertinent part of the apparatus as shown in the drawing referred to.

The olefinic hydrocarbon fraction charged consisted of a fraction of the products obtained by vapor phase cracking of a paraffinic feedstock in the presence of steam. The original diene content of this fraction had disappeared by partial hydrogenation. The mixture consisted of 76% by weight of mono-alkenes, the remainder being saturated hydrocarbons and aromatics.

The catalyst employed contained equimolar amounts of $H_3PO_4$ and $BF_3$ and also water.

Wherever the apparatus came into contact with the catalyst it consisted of stainless steel. The reaction was carried out in a cylindrical 5 liter reactor (10) provided with a jacket for the supply of steam and cooling water for the purpose of controlling the temperature of the reaction mixture, and with a stirrer (16).

The olefinic hydrocarbon charge (11) was introduced as a continuous stream into the reactor (10) at a rate of 275 grams per hour. The volume of liquid reaction mixture in the reactor (10) was kept constant at 3 liters. The liquid reactor contents were maintained in homogeneous phase by intense stirring (750 r.p.m.). Carbon monoxide (12) was forced into the reactor (10) at a pressure of about 100 atm. gauge. The reactor (10) contents were maintained at a temperature of 60° C.

The reactor (10) effluent was divided (20) into an organic product phase (35) and a substantially inorganic catalyst phase (13). The substantially inorganic catalyst phase was in part sent to the reactor (10). The rest was washed with water in a first catalyst purifying zone (22) thereby separating an organic phase (29) from an aqueous catalyst phase (30). The aqueous catalyst phase (30) was subjected to countercurrent liquid contact (36, 37) with organic product phase (35). Thereafter the aqueous catalyst phase was passed (51)+(13a) into the reactor (10).

The organic product phase with which the aqueous catalyst phase was contacted was washed with water (56) in a product purifying zone (38) and the washed product passed (62) to recovery.

The wash-water used to wash the organic product phase was sent (23) to the primary catalyst scrubbing zone (22).

The results obtained in terms of material balance of the operation are set forth in the following Table I wherein the first column identified by reference character the specific part of the apparatus used as shown in the drawing, and the second, third and fourth columns are set forth the compositions of the contents of the specific part of the apparatus to which the reference character in the first column has reference, based per mol (128 g.) of olefin charged to the system.

Table I

| Line | Organic Material | $H_3PO_4+BF_3$ | $H_2O$ |
| --- | --- | --- | --- |
| 11 | 168.5 | | |
| 19 | 261.8 | 596.5 | 54.2 |
| 13 | 68.5 | 574.2 | 52.4 |
| 13a | 63.9 | 536.0 | 48.9 |
| 21 | 4.6 | 38.2 | 3.5 |
| 25 | 4.6 | 40.5 | 15.0 |
| 29 | 4.6 | | |
| 30 | | 40.5 | 15.0 |
| 35 | 193.3 | 22.3 | 1.8 |
| 45 | 193.3 | 62.8 | 16.8 |
| 51 | 1.6 | 60.5 | 16.6 |
| 47 | 191.7 | 2.3 | 0.2 |
| 56 | | | 11.3 |
| 60 | 191.7 | 2.3 | 11.5 |
| 23 | | 2.3 | 11.5 |
| 62 | 191.7 | | |

The organic phase withdrawn (at 29) from the primary catalyst purifying zone and (at 62) from the organic product phase purifying zone were combined. The fatty acid was neutralized with a 25% aqueous NaOH solution. The solution of the soaps was separated from the unconverted alkenes and the by-products, extracted with a light aromatic-free gasoline, acidified with a mineral acid, and again extracted with an aromatic-free gasoline. The gasoline was distilled from the last extract obtained, the fatty acid remaining behind. The unconverted alkenes were separated from the by-products by distillation.

The composition of the organic material so withdrawn (at 29 and 62) was found to be as follows:

|  | Grams |
| --- | --- |
| Fatty acids | 99.5 |
| By-products | 25.0 |
| Unconverted alkene | 21.3 |
| Saturated hydrocarbons and aromatics | 40.5 |
| Total organic material | 196.3 |

A quantity of 57.2% of the alkenes was converted to fatty acids. The total conversion of the alkenes was 83.4%. Hence the conversion of alkenes to fatty acids consists of 68.6% of the total conversion of alkenes. These results were obtained with a content of 9.0% by weight of organic material in the catalyst introduced into the reactor (based on the catalyst including this organic material). It was found that this content was maintained when the organic material was continuously withdrawn from a fraction of the recycling catalyst as described.

In a comparative operation wherein no organic material was removed from the circulating catalyst (the temperature, CO pressure, supply rate of alkene-containing feedstock, volume of the liquid reaction mixture in the reactor, and stirring speed being kept the same as above) the content of organic material in the recycling catalyst rose to 15% by weight; the conversion of alkenes to fatty acids only being about 51%, the total conversion about 78%, and the conversion of alkenes into fatty acids forming about 65% of the total conversion of the alkenes.

We claim as our invention:

1. In the process for the production of mono-carboxylic acids having from about four to about thirteen carbon atoms wherein an olefinic hydrocarbon having from about three to about twelve carbon atoms is reacted with carbon monoxide and an amount of water at least equal to the stoichiometrical equivalent of said olefin in the presence of a liquid catalyst consisting essentially of a boron trifluoride-polybasic inorganic acid complex containing from about five to about twelve percent water at a temperature of from about −10 to about 150° C. and a pressure in excess of about 20 atm. in a reaction zone, while maintaining a single substantially homogeneous liquid phase of relatively constant composition in said reaction zone, said polybasic inorganic acid being selected from the group consisting of phosphoric and sulfuric acids and reaction zone effluence is separated into an organic phase comprising carboxylic acid product and unconverted hydrocarbons and a substantially inorganic phase comprising said catalyst and organic impurities, the steps which comprise diluting at least a part of said substantially inorganic phase with water, thereby forming an aqueous catalyst phase and an organic phase comprising said impurities, introducing at least a part of said aqueous catalyst phase into said reaction zone and controlling the introduction of water into said reaction zone to assure the introduction of an amount of water at least equal to the stoichiometrical equivalent of said olefinic hydrocarbon charge simultaneously with said olefinic hydrocarbon charge into said reaction zone.

2. The process in accordance with claim 1 wherein said aqueous catalyst phase is brought into liquid phase contact with said organic phase separated from said reactor effluence before being introduced into said reaction zone.

3. The process in accordance with claim 1 wherein the amount of water used to dilute said substantially inorganic phase is about equal to the amount of water consumed as reactant in said reaction zone.

4. In a process for the production of mono-carboxylic acid having from about four to about thirteen carbon atoms wherein a monoolefinically unsaturated hydrocarbon having from about three to about twelve carbon atoms is reacted with carbon monoxide and water in the presence of an amount of a water at least equal to the stoichiometrical equivalent of said olefin and of a catalyst consisting essentially of a boron trifluoride-polybasic inorganic acid complex containing from about five to about twelve percent water in a reaction zone at a temperature of from about −10 to about 150° C. and a pressure of from about 20 to about 175 atm., while maintaining a single substantially homogeneous liquid phase of relatively constant composition in said reaction zone, and reactor effluence from said reaction zone is separated in a reactor effluence stratifying zone into a first organic phase comprising carboxylic acid product and unconverted hydrocarbons and a substantially inorganic phase comprising catalyst and inorganic impurities, the steps which comprise passing said substantially inorganic phase into a primary catalyst purifying zone, diluting said substantially inorganic phase with water in said primary catalyst purifying zone, thereby separating a second organic phase comprising organic impurities from an aqueous catalyst phase free of any substantial amount of impurities in said primary catalyst purifying zone, passing aqueous catalyst phase from said primary catalyst purifying zone into said reaction zone and controlling the introduction of water into said reaction zone to assure the introduction of an amount of water at least equal to the stoichiometrical equivalent of said monoolefinic hydrocarbon charge simultaneously with said monoolefinic hydrocarbon charge into said reaction zone.

5. The process in accordance with claim 4 wherein said aqueous phase separated in said primary catalyst purifying zone is extracted in a second catalyst purifying zone with said first organic phase separated in said reactor effluence stratifying zone before being passed into said reaction zone.

6. The process in accordance with claim 4 wherein substantially all of the water reactant required for said carboxylic acid-forming reaction in said reaction zone is introduced into said primary catalyst purifying zone.

7. In the process for the production of mono-carboxylic acids having from about four to about thirteen carbon atoms wherein mono-olefinic hydrocarbons having from about three to about twelve carbon atoms are reacted with carbon monoxide and water in an amount which is at least the stoichiometrical equivalent of said olefinic hydrocarbon in the presence of a catalyst consisting essentially of a complex of boron trifluoride with phosphoric acid containing from about five to about twelve percent water in a reaction zone at a temperature of from about −10 to about 150° C. at a pressure in the range of from about 20 to about 175 atm., while maintaining a single substantially homogeneous liquid phase of relatively constant composition in said reaction zone, and reactor effluence is separated into a first organic phase comprising carboxylic acid and unconverted hydrocarbons and a substantially inorganic phase comprising catalyst and impurities in a reaction mixture stratifying zone, the steps which comprise admixing said substantially inorganic phase with water in a primary catalyst purifying zone, thereby separating an aqueous catalyst phase from a second organic phase comprising impurities in said first catalyst purifying zone, extracting said aqueous catalyst phase separated in said first catalyst purifying zone with said first organic phase in a second catalyst purifying zone, thereby separating a third organic phase comprising carboxylic acid, unconverted hydrocarbons and catalyst components from an aqueous catalyst phase in second catalyst purifying zone, passing aqueous catalyst phase from said second catalyst purifying zone into said reaction zone and controlling the introduction of water into said reaction zone to assure the introduction of an amount of water at least equal to the stoichiometrical equivalent of said monoolefinic hydrocarbon charge simultaneouslyy with said monoolefinic hydrocarbon charge into said reaction zone.

8. The process in accordance with claim 7 wherein a part of said substantially inorganic catalyst phase is passed from said reaction mixture stratifying zone to said reaction zone.

9. The process in accordance with claim 7 wherein a part of said aqueous catalyst phase is passed from said second catalyst purifying zone into said reaction zone.

10. The process in accordance with claim 7 wherein substantially all water of reaction consumed in the process is charged to said first product separating zone.

11. The process in accordance with claim 7 wherein said third organic phase is contacted with water in a product treating zone, thereby separating a fourth organic phase comprising carboxylic acids and unconverted hydrocarbons from an aqueous phase comprising water and catalyst components in said product treating zone, and passing aqueous phase from said product treating zone into said first catalyst purifying zone to be used therein as said water admixed with said substantially inorganic phase.

12. The process in accordance with claim 11 wherein the amount of water introduced into said product treating zone is substantially equivalent to the amount of water consumed in said reaction zone.

13. In the process for the production of mono-carboxylic acids having from about nine to eleven carbon atoms wherein an olefinic hydrocarbon fraction comprising olefins having from eight to ten carbon atoms is reacted with carbon monoxide and an amount of water at least the stoichiometrical equivalent of said olefins, and in the presence of a liquid catalyst consisting essentially of a boron trifluoride-phosphoric acid complex containing from about five to about twelve percent of water, in a reaction zone at a temperature of from about 20 to about 100° C. and at a pressure of from about 20 to about 150 atm., while maintaining a single substantially homogeneous liquid phase of relatively constant composition in said reaction zone, and reactor effluence is separated into a product-containing first organic phase comprising carboxylic acids having from nine to eleven carbon atoms to the molecule in admixture with unconverted hydrocarbons and a substantially inorganic phase consisting essentially of said catalyst and organic impurities of polymeric character, the steps which comprise adding an amount of water which is about the equivalent of the amount of water reactant consumed in said reaction zone to at least a part of said substantially inorganic phase separated from said reactor effluence, thereby forming aqueous catalyst phase and a second organic phase consisting essentially of said organic impurities of polymeric character, passing a part of said aqueous catalyst phase to said reaction zone, extracting the remainder of said aqueous catalyst phase with said first organic phase, thereby forming an organic extract phase and an aqueous catalyst raffinate phase, passing said aqueous catalyst raffinate phase to said reaction zone and controlling the introduction of water into said reaction zone to assure the introduction of an amount of water at least equal to the stoichiometrical equivalent of said olefinic hydrocarbon charge simultaneously with said olefinic hydrocarbon charge into said reaction zone.

References Cited in the file of this patent

UNITED STATES PATENTS

| | | |
|---|---|---|
| 2,876,241 | Koch et al. | Mar. 3, 1959 |
| 2,911,422 | Ercoli | Nov. 3, 1959 |